(No Model.)
J. J. TOWLE.
Combined Foot-Warmer and Lantern.
No. 228,701.  Patented June 8, 1880.
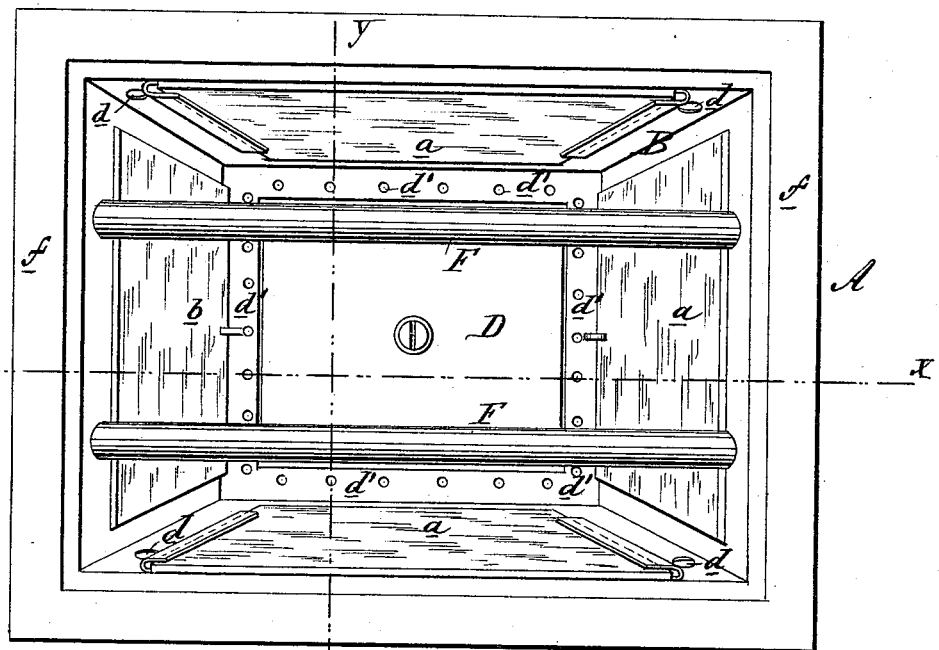
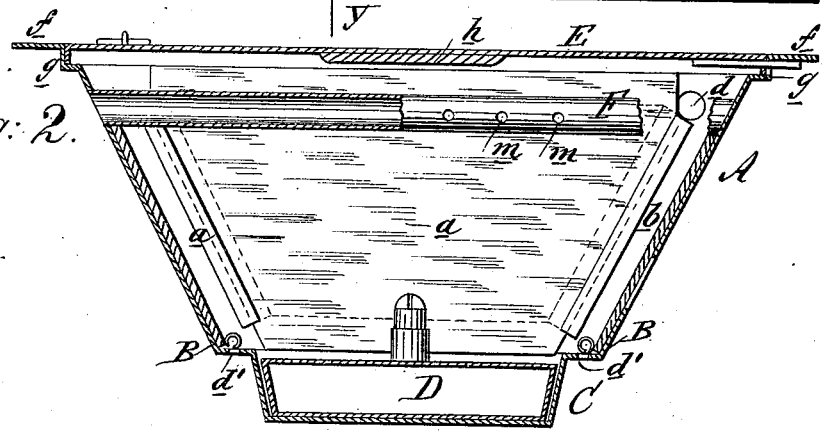
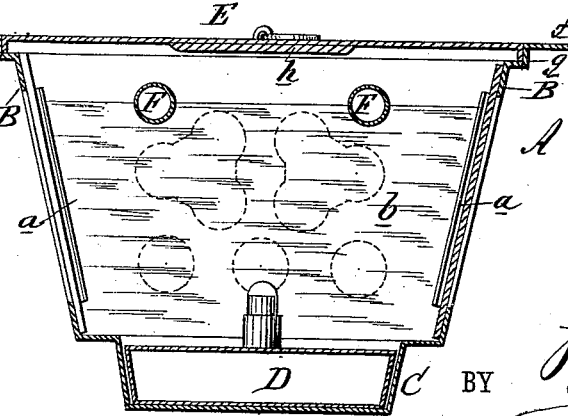
WITNESSES:
A. Schehl.
C. Sedgwick.
INVENTOR:
J. J. Towle
BY
ATTORNEYS.
N. PETERS, PHOTO-LITHOGRAPHER, WASHINGTON, D. C.

UNITED STATES PATENT OFFICE.

JOHN J. TOWLE, OF DIXFIELD, MAINE.

COMBINED FOOT-WARMER AND LANTERN.

SPECIFICATION forming part of Letters Patent No. 228,701, dated June 8, 1880.

Application filed March 9, 1880. (No model.)

*To all whom it may concern:*

Be it known that I, JOHN J. TOWLE, of Dixfield, in the county of Oxford and State of Maine, have invented a new and Improved Combined Foot-Warmer and Lantern, of which the following is a specification.

The object of this invention is to provide a device to be fixed in the bottom of a vehicle for the purpose of warming the feet of the occupants and for throwing light upon the road.

The invention consists, essentially, of a metallic covered box containing a lamp and having glass inserted in three sides, through which the light of the lamp may be transmitted, and of a reflector fixed in a fourth side, said box being designed to be placed in and hung below the floor of a vehicle, to operate both as a foot-warmer and as a lantern.

Figure 1 represents a plan of the device. Fig. 2 is a longitudinal sectional elevation on line $xx$, Fig. 1. Fig. 3 is a transverse sectional elevation on line $yy$, Fig. 1.

Similar letters of reference indicate corresponding parts.

In the drawings, A represents the warmer and lantern, consisting of a frame, B, preferably of iron, having a flat rectangular top and downward and inward sloping sides, in three of which sides are secured plates of glass, $a$, while in the fourth is secured a reflector, $b$, which reflects the light through the glass sides.

In the bottom of this device, attached centrally to the bottom, is a shallow box, C, within which the lamp D is closely fitted, filling the whole area of said box C, so that the said lamp D shall not be shaken about or upset while the vehicle to which it is attached is in motion, said lamp being designed to afford necessary light and heat. The whole device or box is inserted in the bottom of the vehicle, its top being flush therewith, and the air necessary to support combustion is furnished through the openings $d\ d'$, made in the device below the level of the floor of the vehicle.

The flange $f$ is designed to fit in an opening cut in the floor of the vehicle, and thereby to support the device in position.

The shoulder $g$ is designed to be of the thickness of the floor of the vehicle, and to fit in it, while the rest of the device or box is designed to hang below the said floor.

E is a cover designed to shut air-tight upon the top of the device, to exclude the unpleasant odor of burning oil from the vehicle and to afford a rest for the feet. Centrally on the inside of the cover is fixed a plate, $h$, directly over the flame of the lamp, said plate $h$ being designed to strengthen the cover E, to prevent its distortion from the heat of the flame.

F F are tubes extending longitudinally through the device, their ends opening out at either end thereof below the vehicle bottom. These tubes F are provided with lateral openings $m\ m$ within the box, thus securing a draft through said tubes to carry off the products of combustion.

I am aware that foot-warmers to be fixed in the bottoms of vehicles are not new; hence I do not broadly claim them.

I am also aware that it is not new to make a box having its top composed of two perforated metal plates provided with a glass plate in front and a reflector in the rear of the lamp; or a casing provided with an air-tight cover, perforated tubes, and a lamp; or a device with glass sides, to be used as either a lantern or foot-stove.

What I claim is—

In a foot-warmer and lantern, the frame B, having glass plates $a$ and reflector $b$, the shallow lamp seat or box C, the openings $d\ d'$, and the side perforated tubes, F, substantially as shown and described.

JOHN JACKSON TOWLE.

Witnesses:
MARY TAINTER,
LEONARD H. MACOMBER.